US 11,967,849 B2

(12) United States Patent
Temkin et al.

(10) Patent No.: US 11,967,849 B2
(45) Date of Patent: Apr. 23, 2024

(54) ACTIVE FILTER SYSTEM WITH ENERGY STORAGE

(71) Applicant: The Johns Hopkins University, Baltimore, MD (US)

(72) Inventors: Deanna K. Temkin, Silver Spring, MD (US); Tyler J. Boehmer, Columbia, MD (US)

(73) Assignee: The Johns Hopkins University, Baltimore, ND (US)

( * ) Notice: Subject to any disclaimer, the term of this patent is extended or adjusted under 35 U.S.C. 154(b) by 136 days.

(21) Appl. No.: 17/462,951

(22) Filed: Aug. 31, 2021

(65) Prior Publication Data

US 2022/0294246 A1 Sep. 15, 2022

Related U.S. Application Data

(60) Provisional application No. 63/160,020, filed on Mar. 12, 2021.

(51) Int. Cl.
*H02J 7/00* (2006.01)
*H02J 4/00* (2006.01)

(52) U.S. Cl.
CPC .............. *H02J 7/0063* (2013.01); *H02J 4/00* (2013.01); *H02J 7/007182* (2020.01); *H02J 2207/10* (2020.01); *H02J 2207/20* (2020.01); *H02J 2207/40* (2020.01)

(58) Field of Classification Search
CPC ...... H02J 7/0063; H02J 7/007182; H02J 4/00; H02J 2207/20; H02J 2207/40; H02J 2207/10

USPC ......................................................... 307/153
See application file for complete search history.

(56) References Cited

U.S. PATENT DOCUMENTS

| | | | |
|---|---|---|---|
| 8,878,505 B2 | 11/2014 | Temkin | |
| 9,812,864 B2 | 11/2017 | Temkin et al. | |
| 10,439,402 B2 | 10/2019 | Boehmer et al. | |
| 10,862,389 B1* | 12/2020 | Ortiz | H02M 1/15 |
| 10,886,837 B2 | 1/2021 | Boehmer et al. | |
| 2017/0201097 A1* | 7/2017 | Temkin | H02M 1/44 |

\* cited by examiner

*Primary Examiner* — Hal Kaplan
*Assistant Examiner* — Swarna N Chowdhuri
(74) *Attorney, Agent, or Firm* — Todd R. Farnsworth

(57) ABSTRACT

An active filter system for filtering power on a power system may include a converter, an energy storage device, and control circuitry. The converter may be configured to be electrically coupled to a power source at a converter input and an active filter system bus at a converter output. The converter may be configured to deliver power to the active filter system bus that serves a dynamic load. The energy storage device may be electrically coupled to the active filter system bus and configured to filter the power via charge and discharge of an energy storage device. The control circuitry may be configured to control the converter to condition power drawn from the power source to create a filtered load based on programmable active filter controls. The programmable active filter controls may be based on a measurement of a load current being supplied to the dynamic load and a state of charge of the energy storage device.

20 Claims, 12 Drawing Sheets

ACTIVE FILTER SYSTEM WITH ENERGY STORAGE

CROSS-REFERENCE TO RELATED APPLICATIONS

This application claims the benefit of U.S. Provisional Application No. 63/160,020 filed on Mar. 12, 2021, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments generally relate to power systems and, in particular, relate to electric power conditioning for dynamic loads.

BACKGROUND

Dynamic loads, such as high-energy sensors or energy-based weapons, can have massive and sudden fluctuations in current demands. Such loads may be deployed on platforms including mini-grids, which may be implemented on ships, planes, satellites, or the like, power sources can be particularly vulnerable to such abrupt changes in load. The dynamic loads may consume a large portion of the platform's electrical power resources and thereby cause extreme power transients leading to power quality issues on the power system. These extreme power transients may cause operational issues with source equipment, e.g., generators, prime movers, as well as other equipment being powered by the same power system that may damage the equipment or otherwise render the equipment temporarily inoperable.

BRIEF SUMMARY OF SOME EXAMPLES

According to some example embodiments, an active filter system for filtering power on a power system is provided. The active filter system may comprise a converter configured to be electrically coupled to a power source at a converter input and an active filter system bus at a converter output. The converter may be configured to deliver power to the active filter system bus that serves a dynamic load. The active filter system may also comprise an energy storage device electrically coupled to the active filter system bus and configured to filter the power via charge and discharge of an energy storage device. Additionally, the active filter system may also comprise control circuitry configured to control the converter to condition power drawn from the power source to create a filtered load based on programmable active filter controls, the programmable active filter controls being based on a measurement of a load current being supplied to the dynamic load and a state of charge of the energy storage device.

According to some example embodiments, a filter system controller for filtering power on a power system is provided. The filter system controller may operate in cooperation with an energy storage device. The filter system controller may comprise control circuitry configured to receive a measurement of a load current, and receive a state of charge of the energy storage device. The energy storage device may be configured to be electrically coupled to an active filter system bus to filter power delivered to the active filter system bus via charge and discharge of the energy storage device. The control circuitry may also be configured to control a converter of an active filter system to condition power drawn from a power source to create a filtered load on the active power system bus based on programmable active filter controls, the programmable active filter controls being based on the measurement of a load current and the state of charge of the energy storage device.

According to some example embodiments, an example method for filtering power on a power system is provided. The example method may comprise receiving a measurement of a load current and receiving a state of charge of the energy storage device. The energy storage device may be electrically coupled to an active filter system bus to filter power delivered to the active filter system bus via charge and discharge of the energy storage device. The example method may also comprise controlling, by control circuitry, a converter of an active filter system to condition power drawn from a power source to create a filtered load on the active power system bus based on programmable active filter controls. The programmable active filter controls may be based on the measurement of a load current and the state of charge of the energy storage device.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
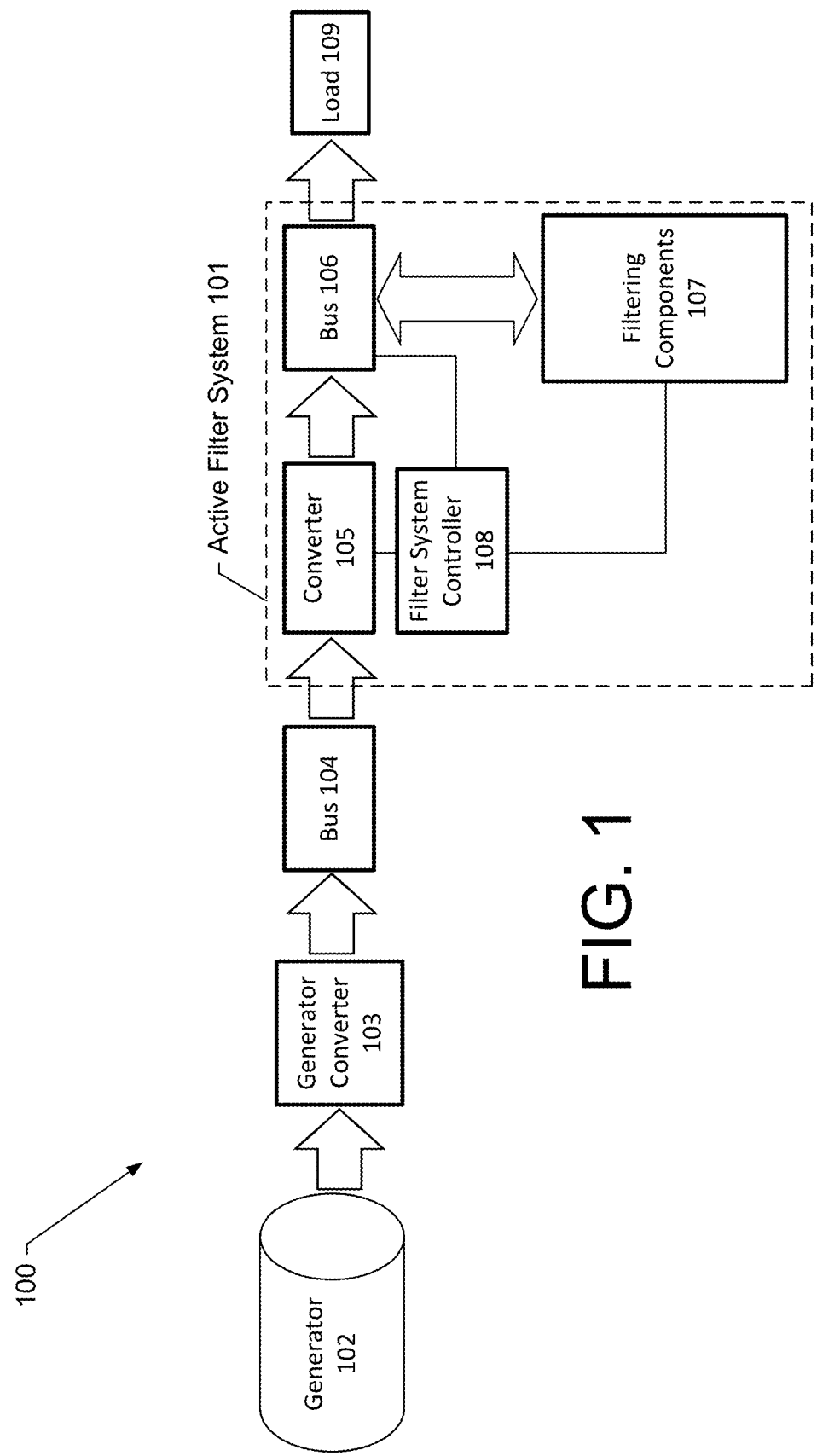
FIG. 1 illustrates an example notional power system comprising an active filter system according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Conventional power distribution systems have focused heavily on providing well-regulated voltages and clean power to a corresponding load. Typically, the voltage dynamics of the load may be addressed by minimizing the output impedance of each converter stage by using small series inductance values, large shunt capacitance values, and/or control loops with high bandwidths. However, conventional power distribution systems may do little to prevent load dynamics at certain frequencies from propagating back to the distribution bus and generator.

In an instance in which the dynamic load profiles propagate back to the platform's electric plant, significant power quality issues and generator/distribution losses may occur. Additionally, dynamic pulse loading may cause wear and tear on mechanical parts of the generator. Torsional stresses to the shaft of the platform's prime mover may result due to very large and quickly changing electromagnetic load torques. The dynamic electromagnetic load torques may also excite the shaft's torsional resonances, e.g. sub-synchronous resonances, adding additional stresses to the primer mover's shaft.

As such, the power quality issues caused by dynamic loads have a substantial impact on the operation of the power system and the equipment being powered by or powering the system. Accordingly, improvements in the area of power system conditioning and transient compensation are desired to protect and extend the lifespans of equipment connected to the electric bus.

According to some example embodiments, an active filter system is provided that leverages the operation of an energy storage device and operates to establish and create a filtered load (sometimes called a filtered profile of the load) to a power system that includes a power source serving, for example, one or more dynamic loads. The active filter system may operate, for example, in the context of an isolated power system (e.g., a mini-grid) where the power source, e.g., a generator, provides electric power to a load that may subject the power system to volatile changes due to the dynamic nature of the load. For example, the power system may provide electric power to loads on a vessel, such as a maritime, aerial, space, or even a land-based vessel. The dynamic loads may be caused by devices such as pulse sensors or weapons systems (e.g., electromagnetic rail guns, directed energy weapons, radars, electronic warfare, and the like) that cause spiked power demands that often cannot be readily accommodated by typical power generation systems and may trip the system offline or damage the source. Additionally, according to some example embodiments, such dynamic loads may occur in other settings where example embodiments may be useful such as, for example, oil rigs and uninterrupted power supplies.

To facilitate meeting the power requirements of such loads, while also maintaining high-levels of power quality on the power system as seen by the source, the active filter system, according to some example embodiments, may employ an energy storage device. However, the energy storage device, for efficient performance, may need to operate within certain ranges (e.g., state-of-charge ranges), and the active filter system may operate to maintain operation of the energy storage device within these ranges. According to some example embodiments, the energy storage device may be a battery. However, other types of energy storage devices may alternatively or additionally be used (e.g., capacitor, super capacitor, flywheel, etc.). Using the battery as an example, the battery may be connected to the power system bus in a manner that permits the battery to perform a filtering operation by sourcing and sinking current on the bus via charging and discharging operations of the battery. In this regard, the battery may be maintained at a certain state-of-charge (e.g., 70% of maximum charge) so that when energy from the bus is available the battery will charge (since the battery is not at a maximum charge) and the battery will operate as a current sink to smooth the power seen by the source when, for example, the load current suddenly decreases. Alternatively, when energy from the bus is not available, the battery will discharge (since the battery is not at a minimum charge) and the battery will operate as a current source to smooth the power seen by the source when, for example, the load current suddenly increases. In this manner, the characteristic charging and discharging of the battery under the different conditions presented by the load permits the battery to operate as a filter to decrease the volatility in the power and current seen by the source. The active filter system, according to some example embodiments, may be configured to maintain the battery at a desired state of charge, even when load volatility is not present, so that the battery will be prepared to perform a sink or source operation when changes in the load dictate. Additionally, in some instances with dynamic loads, for example, the charge and discharge current of the battery may exceed the batteries capabilities or specifications causing the battery to operate outside of desired ranges. The state-of-charge of the battery may affect its ability to sink or source current since, for example, a battery's ability to sink current may be reduced as the state-of-charge increases or decreases, or otherwise moves out of a desired operation range.

Accordingly, to accommodate the operation of the battery to perform filtering operations, a converter connected between the source and the battery may be controlled to, with the battery, create a filtered load as seen by the source of the power system based on a measurement of the load current and programmable active filter controls to filter load dynamics on the system and maintain operation of the battery within desired ranges, despite the dynamic changes in load. According to some example embodiments, the programmable active filters may be based on a measurement of a load current being supplied to the dynamic load, a state of charge of the energy storage device, operational safety limits of the energy storage device, and a desired filter function. For example, implementation of the programmable active filter controls in the converter may operate to maintain the battery at a state of charge and protect the battery from excessive charge and discharge currents, and minimum and maximum voltage constraints. As such, implementation of the active filter controls may operate to regulate the state-of-charge of the battery to a nominal value or within a desired range. To do so, implementation of the active filter controls on the power system may involve the converter filtering the load current with a desired filter function $G_{filt}$ to be used as the desired power draw from the source. According to various example embodiments, the desired filter function may be the dominate control unless other programmable factors including, for example, attributes of the battery or other energy storage device, attributes of the source, attributes of the load, or the like become active and dominate control.

As such, the converter, under the control of the active filter controls, may operate in coordination with the energy storage device to create a filtered version of the load drawn from the source. In this regard, the load current, for example, at the load may remain unchanged based on the demands of the load (e.g., may be volatile), however, the current drawn by the source, due to the power demands introduced by the load, may be filtered, and the source may see a filtered load. For example, the volatility of the load may be filtered to create a filtered load for the source that is smoothed, thereby removing at least some of the volatility introduced by the load.

According to some example embodiments, the filtering may be performed by the energy storage device, and a collection of active filter controls may be implemented to ensure that the energy storage device is being operated at state of charge that supports highly effective filtering. The active filter controls may be combined in manner such that any one control, when triggered, may dominate to control the converter to bring the operation of the battery back into desired ranges. These active filter controls may monitor certain system parameters and act based on a comparison to a respective limit or threshold. As such, the active filter controls may actively adjust the filtering based on the system parameters. The parameter limits may be defined based on attributes of, for example, the battery.

In addition to other system parameters, the active filter controls may be adjusted based on monitored operating parameters specifically associated with operation of the energy storage device. In this regard, operating parameters such as, for example, charge or discharge current of the energy storage device, voltage across the terminals of the energy storage device, current into or out of the energy storage device, or state-of-charge (SOC) of the energy storage device may be considered. Such operational parameters may be considered in view of, for example, specified limitations of the energy storage device, such as maximum charge and discharge current limits, minimum and maximum voltage limits, minimum and maximum SOC limits, maximum source current limits, or the like. These limits may be selected to maintain high-performance filtering by the energy storage device. In this way, for example, a battery may be leveraged to at least assist with filtering at desired operating conditions (e.g., SOC) as controlled by the converter via the active filter controls.

Additionally, according to some example embodiments, the active filter system may also employ a shunt active filter, which may also be referred to as an adaptive power system, in combination with the energy storage device to increase the filtering capabilities of the active filter system. In this regard, the shunt active filter may employ a supplemental energy storage device that can be controlled to operate as a variable shunt to perform further filtering (e.g., high-frequency filtering) by sourcing and sinking current from the bus. In this regard, according to some example embodiments, the primary energy storage device (e.g., battery) may largely contribute to filtering on lower-frequency, large dynamics on the power system, while the shunt active filter may largely contribute to filtering higher-frequency (e.g., noise-based) dynamics. According to some example embodiments, the shunt active filter may be configured to operate in response to the battery reaching, and in some instances in response to the control circuitry determining that the battery has reached, a charge or discharge rate or current limit (e.g., battery is discharging too fast or charging too fast), and, in some implementations, operation of the shunt active filter may otherwise be dormant or non-operational. Alternatively, the battery may be configured to operate in response the active shunt filter reaching, and in some instances in response to the control circuitry determining that the battery has reached, a charge or discharge rate or current limit (e.g., the supplemental energy storage device of the active shunt filter is discharging too fast or charging too fast), and, in some implementations, operation of the battery to perform filtering may otherwise be dormant or non-operational. However, rather than having triggering events where either the energy storage device or the active shunt filter become active, according to some example embodiments, the shunt active filter and the energy storage device may be configured to continuously operate, in unison, to perform simultaneous filtering.

According to some example embodiments, the active shunt filter may employ one or more capacitors or other energy storage devices such as super capacitors as the supplemental energy storage device. The operation of the capacitor within the active shunt filter may provide additional filtering that the primary energy storage device (e.g., a battery) may not be capable of providing due to, for example, power constraints. In this regard, for example, a battery may not be capable of filtering the full load dynamics as the sole filter component, while maintaining the battery within desired operational ranges (e.g., desired state of charge operational ranges). The capacitor of the active shunt filter, however, may be sized to operate in coordination with the operating parameters of the battery to be able to filter the remaining portion of the dynamic load that the battery may not address. Accordingly, the use of the active shunt filter and its supplemental energy storage device in this manner, may complement the operation of the battery and reduce or avoid the need to utilize oversized batteries to satisfy the power filtering demands in an effort to maintain the battery within desired operating limits. Similarly, the combined use with the battery may also allow for use of lighter weight capacitors in the active shunt filter.

As mentioned above, the active filtering being performed, according to some example embodiments, may be implemented by controlling a converter feeding the power system from the source via implementation of active filter controls, where the converter is connected to the system bus. The converter may be a bidirectional or unidirectional converter. Control circuitry may be configured to implement programmable active filter controls that are used to control the operation of the converter to support filtering operations by the energy storage device. A variety and combinations of active filter controls may be employed according to some example embodiments. In this regard, a load filter control may contribute to the active filtering, which may be based on the load current. The load filter control may also be implemented in consideration of the SOC of the energy storage device. Additionally or alternatively, an SOC clamp control may be implemented to limit the minimum and maximum charge or charge current of the energy storage device. Additionally or alternatively, voltage and/or current clamp controls may also be implemented as active filter controls based on the voltage across the energy storage device or the current exiting/entering the energy storage device. Further, according to some example embodiments, a load current command signal from the shunt active filter may also be considered with the SOC of the energy storage device to provide an active filter control.

As such, the active filter system may, according to some example embodiments, leverage energy storage in combination with active filtering techniques to provide high power-quality on systems with dynamic loads to smooth the load seen by the source. The active filter system may operate to protect the electric source (e.g., generator and prime mover) and other components connected to the power system while also supporting the power requirements of the dynamic load. For example, highly dynamic pulse loads may be compensated for by the active filter system to maintain a smooth power draw from the power source.

Having generally described some aspects of an active filter system according to some example embodiments, reference will now be made to FIG. 1 which illustrates an example notional power system 100 including an active filter system 101. The notional power system 100 may include a generator 102, a generator converter 103, a bus 104, the active filter system 101, and a load 109. The generator 102 may be a steam turbine, gas turbine, jet turbine, diesel generator, or other generator configured to supply power to the platform. The generator 102 may output a voltage such as 300 VAC, 450 VAC, 4160 VAC, or the like. While the generator 102 is provided as a source for the example power system 100, it would be understood and contemplated by one of ordinary skill in the art that, in some example embodiments, the source may be the electric power grid, a solar power grid, a fuel cell, a battery, a prime mover, or the like.

Between the output of the generator 102 and the bus 104, the power system 100 may include a generator converter 103. The generator converter 103 may be configured to convert the energy output of the generator 102 to a characteristic form appropriate for the bus 104. In this regard, the generator converter 103 may be configured to convert an AC output of the generator 102 to a different voltage AC or DC voltage. Alternatively, for a DC generator output, the generator converter 103 may be configured to convert the DC output to another DC voltage, or an AC voltage. As such, the output of the generator converter 103 may drive the bus 104 to be a low voltage DC bus (e.g., 0 to 1500 V), a medium voltage DC bus (e.g., 15 kV to 50 kV), an medium voltage AC bus (e.g., 30 kV to 150 kV), or the like. In this regard, the generator converter 103 may be embodied as a solid state rectifier, such as a diode rectifier, a motor generator, or the like, configured to convert electrical power at the input to a desired output electrical power for the bus 104 based on a provided control signal or scheme. According to some example embodiments, the bus 104 may be an intermediate bus for serving some loads configured to operate at the voltage of the bus 104.

The bus 104 may operate as the input to the active filter system 101 according to some example embodiments. As such, the bus 104 may be the power input to the convertor 105 of the active filter system 101. Although bus 104 is shown in FIG. 1 and described above as being an input to the active filter system 101, according to some example embodiments, the generator 102 may be electrically connected directly to the convertor 105, thereby eliminating the generator converter 103 and the bus 104. As such, the converter 105 may operate as the generator convertor and may be structured and configured the same or similar to the generator convertor 103 as described above.

The active filter system 101 may comprise the convertor 105, an active filter system bus 106, filtering components 107, and a filter system controller 108. The converter 105 may be a unidirectional or bidirectional converter. As mentioned above, converter 105 may be configured to operate in the same or similar manner as the generator converter 103, whether the converter 105 is connected to the generator 102 or to the bus 104. As such, the converter 105 may be configured to be electrically coupled to an input power source, in the form of the generator 102 or the bus 104, at an input of the converter 105 and the active filter system 101. The converter 105 may also be configured to provide output power at the converter output to a bus 106 of the active filter system 101 based on active filter controls to create a filtered load as the power draw for the source. As such, the converter 105 may be controllable to control output characteristics of output power based on a control signal and encoded controls provided by the filter system controller 108 in the control signal to the converter 105.

The filtering components 107 may be devices or systems that are configured to act upon the bus 106 to affect the power on the bus 106 by performing a filtering operation to support the power demands of the load 109 and condition the power seen by the source (e.g., the generator 102). In this regard, the filtering components 107 may include or be embodied as a battery, a super capacitor, a flywheel, a shunt active filter (SAF), or the like. The filtering components 107 may be connected to the bus 106 in shunt and may be passive or active components that operate to provide the power to support the transients and other irregularities on the bus 106 thereby smoothing the power seen by generator 102. For example, a battery operating as a filtering component 107 may charge or discharge to support the instantaneous demands on the power system. Additionally, the filtering components 107 may also comprise a shunt active filter that is controllable and able to also filter transients and irregularities on the bus 106 under the control of the filter system controller 108 in cooperation with the converter 105 and, for example, a battery.

The filter system controller 108 may be circuitry configured to receive various inputs and generate an output signal to control operation of the converter 105. The filter system controller 108 may be circuitry that utilizes hardware-implemented functionality (e.g., via a field programmable gate array (FPGA), application specific integrated circuit (ASIC), or the like) or software-implemented functionality (e.g., via execution of program code instructions stored on a memory and executed by a processor). The filter system controller 108 may be independent of, or integrated into, the converter 105. The inputs that the filter system controller 108 may receive include the current to the load 109 from the bus 106, the voltage and current of the filtering components 107, the SOC of the filtering components 107, a desired output current from the bus 106, and the like. In this regard, the filter system controller 108 may have monitoring connections to bus sensors (e.g., current sensors, voltage sensors, or the like) that are operably coupled to the bus 106 for monitoring. Additionally, sensors for the filtering components 107 may also be included that are operably coupled to the filtering components 107 to measure state of charge, voltage, and current of the energy storage, and the sensors may provide measurements to the filter system controller 108 for evaluation. Some or all of these inputs may be used or transformed into active filter controls and combined into a control signal provided to the converter 105 to control the converter 105 to operate in accordance with the active filter controls to, with the energy storage device, create a filtered load as the power draw for the source.

The bus 106 may form an output of the active filter system 101 which serves a load 109. According to some example embodiments, the bus 106 may directly serve the load 109 as an unregulated output, or the bus 106 (or a portion of the bus 106) may include an output converter that provides a further regulated output from the bus 106 to serve certain loads 109. In this regard, the output converter may convert from DC to AC, DC to DC, (or even in other embodiments AC to DC or AC to AC) or the like. Further, the output converter may increase or decrease the voltage level to an appropriate voltage to serve the load 109. As mentioned above, the load 109 may include at least a component that is a dynamic load that may, for example, cause pulse-type energy demands and extreme variations in the load on the bus 106.

Figure 2A:
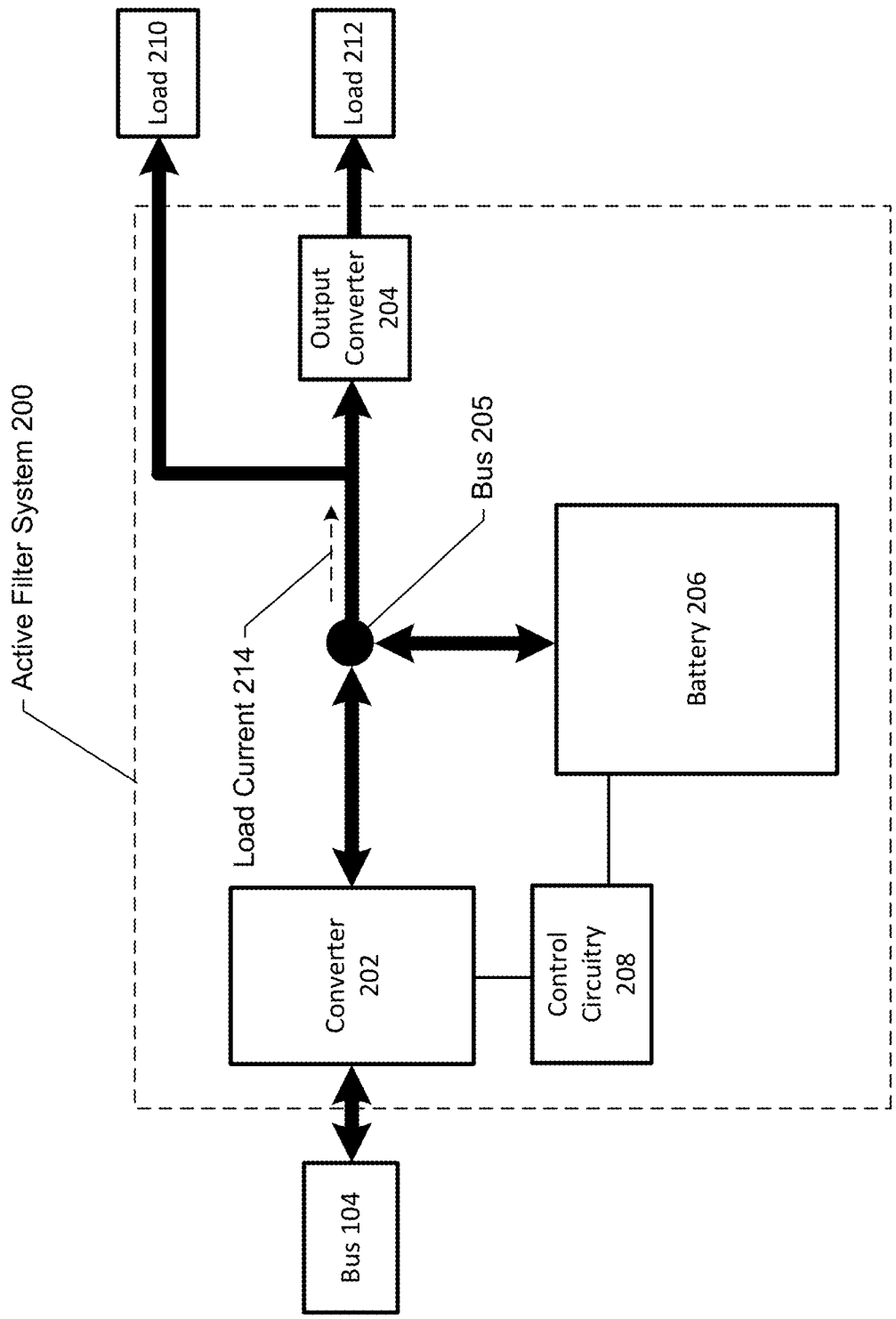
FIG. 2A illustrates an example active filter system according to some example embodiments.

Now referring to FIG. 2A, a description of an example embodiment of an active filter system 200 is provided. The active filter system 200 may be connected to the source bus 104 (or generator 102) at source-side or input of the active filter system 200 and to one or more loads 210 and 212 (at least one of which may be a dynamic load) at a load-side or output of the active filter system 200. Additionally, the active filter system 200 may comprise a converter 202, an output converter 204, an active filter system bus 205, a battery 206, and control circuitry 208.

The converter 202 may be structured and operate in the same or similar manner as the converter 105 described above. Further, the converter 202 may comprise a converter input which may be electrically connected to the source bus 104, and a converter output which may be connected to the active filter system bus 205. As described herein, the converter 202 may perform a controlled conversion of the source and deliver output power to the bus 205. The controlled conversion may be performed based on a control signal (e.g., which may comprise one or more signals) provided by the control circuitry 208, which may be structured and operate in the same or similar manner as, or as a component of, the filter system controller 108 described above. The control signal may include or be based on programmable active filter controls for creating a filtered load for the power draw by the source and to facilitate filtering performed by the battery 206. The active filter controls may be based at least in part on a filter function and a number of clamping controls that may be combined to form the control signal. The filter function, according to some example embodiments, may be implemented as a component of an active filter control that operates to maintain the battery 206 at a desired state of charge based on a load current measurement, a state of charge measurement, and a state of charge reference value (i.e., the desired state of charge). Other active filter controls may be implemented as clamping controls that intervene when conditions on the system exceed desired operational limits of the energy storage. As such, the control circuitry 208 may be configured to receive a number of parameter inputs (e.g., an indication or measurement of the load current 214), as further described herein, to generate the control signal for controlling the operation of the converter 202 to, with the assistance of the battery 206, create the filtered load. The parameter inputs may be inputs for active filter controls that are combined to form the control signal used to control the converter 202 to, in turn, control attributes of the power on the bus 205 (e.g., limit the current on the bus 205) to maintain the battery 206 within desired operational ranges to create the filtered load. In particular, implementation of the active filter controls may operate to maintain the operation of the battery 206 and allow for the performance of filtering operations in controlled manner that provides a filtered current at the source (e.g., generator) and limits the battery's operation within boundaries to maintain the filtering performance of the battery 206, and also maintain the health and life of the battery 206.

The battery 206, as an example of a filtering component 107, may be formed as a lithium ion battery, lithium iron phosphate battery, lead acid, or the like. According to some example embodiments, the battery 206 may be a bank of batteries. Further, the battery 206 may operate at a certain voltage such as, for example, 800 to 1050 V. The battery 206 may be any type of rechargeable battery that is configured for connection to the bus 205 to either pull energy (or sink current) from the bus 205 for charging, when energy is available for charging and not demanded by the loads 210 and 212, or push energy to the bus 205 (or source current), when energy is not available due to increased demand from loads 210 and 212. Accordingly, the battery 206 may operate as a filter for transients or irregularities on the system due to the battery's ability to sink or source power from/to the bus 205. Because the state-of-charge of the battery 206 may affect the battery 206's ability to sink or source current, the battery 206, according to some example embodiments, may be controlled to operate within a desired state-of-charge region for the battery 206, where the ability to sink or source current is maximized. To operate in this range, according to some example embodiments, the battery 206 may be oversized with respect to powering the load, and therefore the effect on the state of charge of such an oversized battery by sink and source operations would have less impact than a battery that was sized for the load. In other words, a larger battery may have a more robust ability to maintain a desired state of charge despite changes in the load making filtering more accessible in the operating range.

The operation of the battery 206 and the converter 202, under the control of the control circuitry 208, may supply the dynamic demands of loads 210 and 212, as well as cause the source to draw smooth current. In this regard, the output power provided on the bus 205 may be provided directly to a load 210 (which may be a dynamic load) as an unregulated output. Additionally or alternatively, the bus 205 may provide the output power to an output converter 204. The output converter 204 may be configured to convert the output power to, for example, a different voltage to provide power to the load 212 (which may be a dynamic load). As described herein, the output converter 204 may make other transformations to the output power provided on the bus 205 to support energy delivery to the load 212 as a regulated output of the active filter system 200.

Figure 2B:
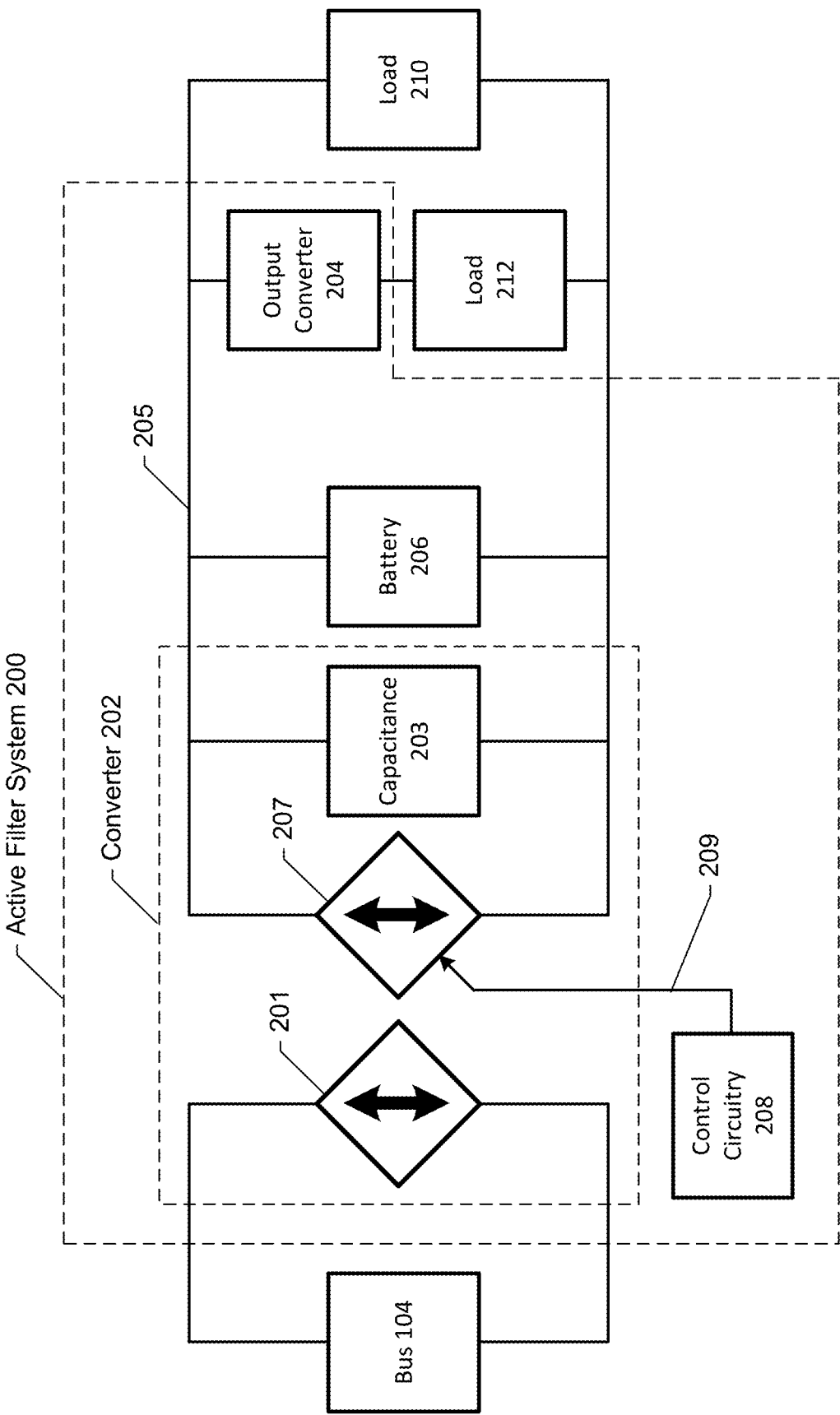
FIG. 2B illustrates an example model of an active filter system according to some example embodiments.

Now referring to FIG. 2B, an example circuit model or equivalent circuit model of the active filter system 200 is shown. In this regard, an equivalent circuit for the converter 202 is shown with an indication of the control input from the control circuitry 208 providing the control signal 209. As such, the converter 202 is shown as comprising a dependent current source 201, a dependent current source 207, and a capacitance 203. Via operation of these components, the converter 202 may be configured to be a unidirectional or bidirectional device that converts between AC to DC or DC to DC, and transforms voltages to be a step up or a step down in voltage. As shown in FIG. 2B, the control circuitry 208 may create a filtered load by providing the control signal 209 to the dependent current source 207 by controlling the output power of the converter 202 on the bus 205. The capacitance 203 of the converter 202 may be representative of an output capacitance of the converter 202, which may operate to provide at least some high-frequency filtering.

The components shown in FIG. 2B are shown in a connection configuration based on the configuration in FIG. 2A, albeit in slightly more detail.

Figure 2C:
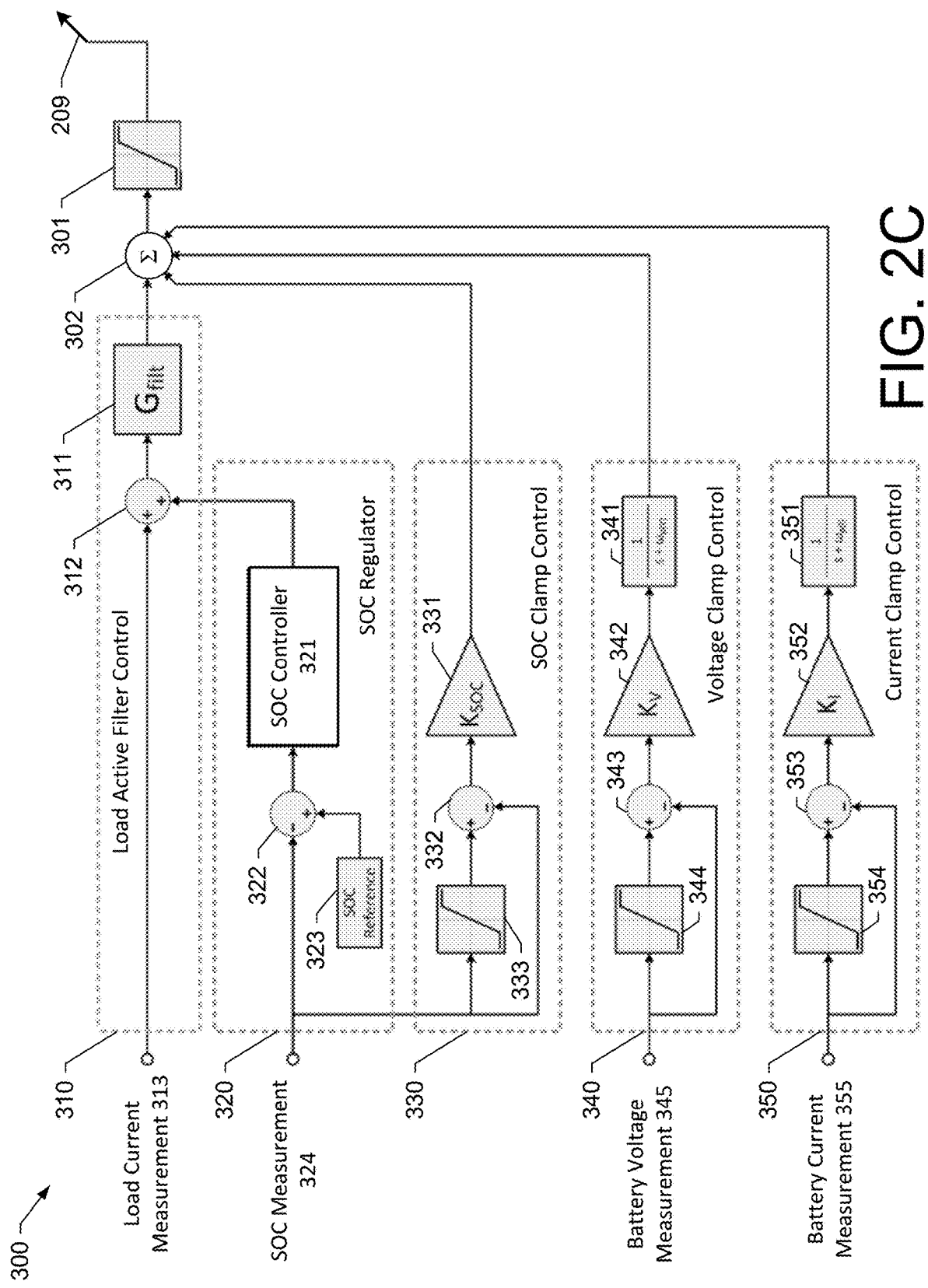
FIG. 2C illustrates an example active filter controls according to some example embodiments.

FIG. 2C illustrates the functional configuration 300 of a portion of the control circuitry 208 with respect to the active filter controls used to control the operation of the converter 202 to create the filtered load for the power draw by the source of the active filter system 200. In this regard, the active filter controls used to create the filtered load may be tunable to obtain a desired filter strength and resulting current draw from the source bus 104. The functional configuration 300 illustrated and described with respect to FIG. 2C may be embodied in hardware components, such as an FPGA, ASIC, passive components, and the like, or in software code executed by a processor. As such, to generate the control signal 209 (which may also be referred to as an output-current command), the functional configuration 300 may include a number of active filter controls that are combined at a summation component 302 and passed through an output limiter 301. The output limiter 301 may be configured to control a maximum or minimum level for the control signal 209 such that the signal may be clipped at a maximum or minimum level. The output limiter 301 may be useful, in particular, when more than one active filter control has been triggered and the magnitude of the output of the summation component 302 is therefore higher than necessary to control the current by the converter 202.

The active filter controls may include a load active filter control 310, which may be the primary active filter control for non-clamped operation of the converter 202. The load active filter control 310 may operate to control current output by the converter 202 to be within battery 206's charge and discharge limits while also smoothing the power seen by the source to the desired levels. The load active filter control 310 may be determined based on a load current measurement 313 (e.g., measurement of load current 214 on the bus 205), and an SOC measurement 324 of the SOC of the battery 206. The load current may be measured by a load current sensor that may be electrically coupled to the bus 205 for detection of the load current, and the load current sensor may provide an output in the form of the load current measurement 313 to the control circuitry 208 indicative of, for example, the magnitude and/or phase of the load current. The SOC of the battery 206 may be measured and provided by an SOC sensor of the battery 206 that provides an output in the form of an SOC measurement 324 to the control circuitry 208 indicative of the state-of-charge of the battery 206.

The SOC measurement 324 may be an input to an SOC regulator 320 that generates an SOC output for use by the load active filter control 310. The SOC regulator 320 may be configured to maintain the SOC of the battery 206 to maintain a desired SOC. For example, a 70% SOC set point may be defined such that the battery 206 may be controlled to maintain the battery 206 in a state that can accept high charge and discharge rates. Controlling the battery 206 in this manner avoids operation of the battery 206 near SOC limits that would hamper the battery's ability to sink or source dynamic currents for filtering. In this regard, many Li-ion batteries are charged at a constant current below 70% SOC. For a Li-ion battery above 70% SOC, the battery may be held at a constant voltage until the current decays below a minimum threshold to complete the charge in order to not exceed battery voltage limits. As such, these operational modes for charging the battery 206 are not desirable when using the battery 206 as a filter, and therefore the active filter controls operate to maintain the battery 206 at the desired SOC to maintain the battery's ability to effectively filter the output power in the presence of dynamic loads.

Accordingly, the SOC measurement is used, along with the load current, to maintain the SOC of the battery 206 within a desired range of SOC for effective operation. The SOC regulator 320 may be configured to generate a usable output that may be combined with the load current measurement 313 for use in creating a filtered load.

In this regard, the SOC regulator 320 may comprise a summation component 322 and an SOC controller 321. The summation component 322 may be configured to receive the SOC measurement 324 and compare the SOC measurement 324 to an SOC reference 323 value to determine a difference value between the SOC measurement 324 and the SOC reference 323. This difference value may be provided to the SOC controller 321. The SOC controller 321 may act upon the difference value to convert the difference value into a representative value that may be combined with the load current measurement 313 in a summation component 312 of the load active filter control 310. According to some example embodiments, the SOC controller 321 may be configured to drive the difference between the SOC measurement 324 and SOC reference 323 to zero. As such, the SOC regulator 320 may be configured to provide an input to the load active filter control 310 to permit control of the current output of the converter 202 based on the SOC, in a non-clamping mode (as further described below), in such a manner as to maintain the SOC at the desired SOC reference 323.

For the load active filter control 310, the output of the SOC regulator 320 may be combined with the load current measurement 313 in the summation component 312, the output of which may be provided to a filter function $G_{filt}$ 311, which may be programmable based on the desired power profiles allowed by the source bus 104 or generator 102 capabilities. In this regard, the filter function 311 may be defined to control the current output to the bus 205 to maintain operation of the battery 206 within a desired range for SOC, while filtering the current drawn from the source. According to some example embodiments, the filter function $G_{filt}$ may be defined to control the current from the converter 202 with a programmable filter, such as, for example, a programmable low-pass filter. Accordingly, the output of the filter function 311, and thus the output of the load active filter control 310, may be provided to the summation component 302. If no clamping event has occurred, as further described below, the output of the load active filter control 310 may be unaffected by the summation component 302. Further, if the load active filter control 310 does not exceed a clipping limit of the output limiter 301 (and no clamping event has occurred), the load active filter control 310 may be the control signal 209 for provision to the converter 202.

However, in some instances the SOC, the battery voltage, and/or the battery current may exceed respective limits that would lead to the implementation of a clamping event requiring that the steps be taken to control the current accordingly. In this regard, if a clamping event occurs, an output of a respective clamping control provided to the summation component 302 may dominate the summing operation. As such, the clamping output may dominate the output of the summation component 302, and if the output passes through (or even is capped by) output limiter 301, a response to the clamping event may be implemented by the converter 202 due to the nature of the control signal 209 in a context of a clamping event.

As such, the following provides three different active filter controls used as clamping controls that are capable of causing the filtered load to be altered due to the occurrence of a clamping event. In this regard, a clamping event may occur when, for example, the SOC of the battery 206 is not within a desired range, the voltage across terminals of the battery 206 is not within a desire range, or the current of the battery 206 is not within a desired range.

Accordingly, a first clamping active filter control may be the SOC clamp control 330. The SOC clamp control 330 may operate to maintain the battery 206 within maximum and minimum SOC limits by controlling the current output of the converter 202. The SOC clamp control 330 may be based on the SOC measurement 324 and an SOC limit or range. The SOC measurement 324 may be provided to an output limiter 333 that may have a desired limit value for the SOC of the battery 206. The output of the output limiter 333 may be provided to the summer component 332 along with the SOC measurement 324 directly. The output of the summer component 332 may be provided to an amplifier 331 to apply (e.g., multiply) a gain $K_{SOC}$ to the output of the summer component 332, which may be provided to the summer component 302 for combination with the other controls.

More specifically, the summer component 332 may be configured to operate as a subtractor. As such, when the SOC measurement 324 is within a range to be unaffected by the output limiter 333, the SOC measurement 324 is passed, without modification, to the summer component 332 and is essentially subtracted from itself. Therefore, in this scenario, the output of the summer component 332 is zero and application of the gain $K_{SOC}$, also results in the SOC clamp control 330 being zero. As such, the SOC clamp control 330 would have no impact on the control signal 209.

However, in an instance in which, for example, the SOC measurement 324 exceeds an SOC limit of the output limiter 333, the SOC measurement 324 provided to the output limiter 333 would be clipped at the limit. As such, the difference between the clipped output of the output limiter 333 and the SOC measurement 324 will be non-zero and will be multiplied by the gain $K_{SOC}$ of the amplifier 331. The SOC clamp control 330 may therefore have a substantial impact on the output of the summer component 302 (e.g., due to $K_{SOC}$ being large). Therefore, the control signal 209 may cause the converter 202 to compensate the output current to cause the SOC of the energy storage device to not exceed the SOC limits by any significant amount.

The voltage clamp control 340 may operate in a similar manner. The voltage clamp control 340 may operate to maintain the energy storage device within maximum and minimum voltage limits by controlling the current output of the converter 202. In this regard, the voltage clamp control 340 may be based on the voltage across the battery 206 and a voltage limit or range. A battery voltage measurement 345 may be captured by a voltage sensor of the battery 206 that provides the battery voltage measurement 345 to the control circuitry 208. The battery voltage measurement 345 may be provided to an output limiter 344 that may have a desired limit value for the voltage of the battery 206. The output of the output limiter 344 may be provided to the summer component 343 along with the battery voltage measurement 345 directly. The output of the summer component 343 may be provided to an amplifier 342 to apply (e.g., multiply) a gain $K_V$ to the output of the summer component 343. Additionally, the output of the amplifier 342 may be provided to a transfer function 341, and the output of the transfer function 341 may be provided to the summer component 302 for combination with the other controls.

More specifically, the summer component 343 may be configured to operate as a subtractor as described above with respect to the summer component 332. As such, when the battery voltage measurement 345 is within a range to be unaffected by the output limiter 344, the battery voltage measurement 345 is passed, without modification, to the summer component 343 and is essentially subtracted from itself. Therefore, in this scenario, the output of the summer component 343 is zero and application of the gain $K_V$ and the transfer function 341, also results in the voltage clamp control 340 being zero. As such, the voltage clamp control 340 would have no impact on the control signal 209.

However, in an instance in which, for example, the battery voltage measurement 345 exceeds a voltage limit of the output limiter 344, the battery voltage measurement 345 provided to the output limiter 344 would be clipped at the voltage limit. As such, the difference between the clipped output of the output limiter 344 and the battery voltage measurement 345 will be non-zero and will be multiplied by the gain $K_V$ of the amplifier 342 and subjected to the transfer function 341. The voltage clamp control 340 may therefore have a substantial impact on the output of the summer component 302 (e.g., due to $K_V$ being large). Therefore, the control signal 209 may cause the converter 202 to compensate the output current to prevent the voltage across the battery 206 from exceeding the desired operating range by any significant amount.

Additionally, the current clamp control 350 may operate based on the current into the battery 206. The current clamp control 350 may operate to maintain the energy storage device within maximum and minimum current limits by controlling the current output of the converter 202. The current clamp control 350 may also be based on a current limit or range. A battery current measurement 355 may be captured by a current sensor of the battery 206 that provides the battery current measurement 355 to the control circuitry 208. The battery current measurement 355 may be provided to an output limiter 354 that may have a desired limit value for the current at the battery 206. The output of the output limiter 354 may be provided to the summer component 353 along with the battery current measurement 355 directly. The output of the summer component 353 may be provided to an amplifier 352 to apply (e.g., multiply) a gain $K_I$ to the output of the summer component 353. Additionally, the output of the amplifier 352 may be provided to a transfer function 351, and the output of the transfer function 351 may be provided to the summer component 302 for combination with the other controls.

More specifically, the summer component 353 may be configured to operate as a subtractor as described above with respect to the summer component 332. As such, when the battery current measurement 355 is within a range to be unaffected by the output limiter 354, the battery current measurement 355 is passed, without modification, to the summer component 353 and is essentially subtracted from itself. Therefore, in this scenario, the output of the summer component 353 is zero and application of the gain $K_I$ and the transfer function 351, also results in the current clamp control 350 being zero. As such, the current clamp control 350 would have no impact on the control signal 209.

However, in an instance in which, for example, the battery current measurement 355 exceeds (or falls below) a current limit of the output limiter 354, the battery current measurement 355 provided to the output limiter 354 would be clipped at the limit. As such, the difference between the clipped output of the output limiter 354 and the battery current measurement 355 will be non-zero and will be multiplied by the gain $K_I$ of the amplifier 352 and subjected to the transfer function 351. The current clamp control 350 may therefore have a substantial impact on the output of the summer component 302 (e.g., due to $K_I$ being large). Therefore, the control signal 209 may cause the converter 202 to compensate the output current to cause the current at the battery 206 to not exceed the desired operating range by any significant amount.

As such, the summer component 302 operates to combine the load active filter control 310, the SOC clamp control 330, the voltage clamp control 340, and the current clamp control 350. In an instance where more than one of the clamping controls are triggered (i.e., the input exceeds the limit of the respective output limiter), the controls may add together to, for example, have an excessively high magnitude. As such, the output limiter 301 addresses this situation and limits the control signal 209 to a maximum value, regardless of the number of clamping controls that are triggered.

Figure 2D:
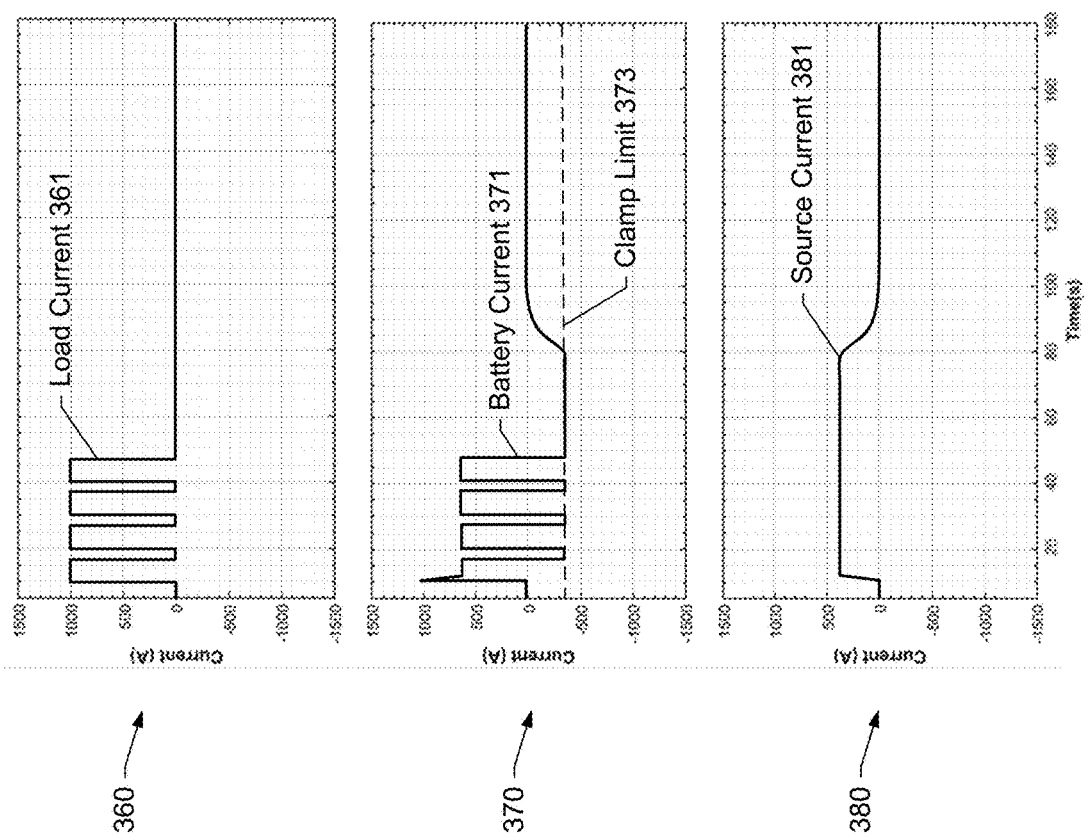
FIG. 2D illustrates graphs of currents for a power system operating using an example active filter system according to some example embodiments.
Figure 2E:
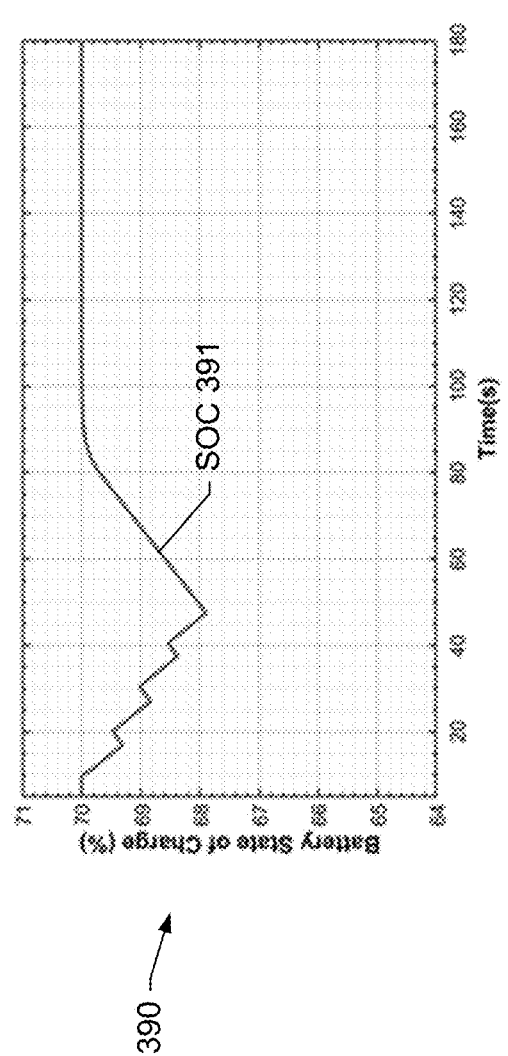
FIG. 2E illustrates a graph of a state-of-charge of a battery operating the scenario illustrated in FIG. 2D according to some example embodiments.

FIGS. 2D and 2E graphically illustrate the operation of the active filter system 200. As such, graph 360 illustrates the load current 361 demanded by a dynamic load that takes the form of a repeating square wave with a minimum of zero amps and a maximum of 1000 amps. The graph 370 illustrates the battery current 371 that occurs as a result of the dynamic load. In this regard, it can be seen that the battery current initially jumps to 1000 amps to support the load. Because of the filtering performed by active filter system 200, the battery current 371 begins to drop as the converter 202 output increases. However, due to operation of the output limiter 301, the converter 202 reaches its maximum output of 380 A, requiring the battery 206 to deliver the remaining 620 A. In this example, the limit of 380 A may be chosen to match the battery maximum charge rate in order to prevent undesirable dynamics from propagating to the source due to the battery current clamp controls 350, as described below. When the load current drops to zero, the battery current goes negative (charging the battery), as the converter 202 does not immediately react to the load as a function of the active filter controls. The SOC regulator 320 is attempting to command more current out of the converter 202, but is limited by the battery current clamp control 350. In this way, because the converter 202 was limited to 380 A while the load was drawing its peak current, when the load pulse is removed and the battery current is clamped to its maximum charge current of 380 A, the converter 202 sees no change in output, and subsequently, no power dynamics are seen in the upstream power system (e.g., bus 104 up to generator 102). Once the load fluctuations are complete, the battery continues to charge until a desired SOC is reached, and then the converter may control the current to prevent further charging, i.e., outside of the desired SOC range.

Additionally, as shown in graph 380, the source current 381 is filtered in a manner that does not include the abrupt changes in current at the load. As such, the power quality seen by the source is high, despite the rapid changes in the load current 361. Accordingly, the source (e.g., the generator 102) does not have to endure the rapids changes in current, which reduces stress on the source and increases the lifespan of the source.

FIG. 2E illustrates a graph 390 of the SOC 391 of the battery in the scenario shown in FIG. 2D. As can be seen, with each change in the load current and related discharge of the battery, the SOC 391 of the battery continues to drop from, for example, a desirable SOC of 70% to an SOC of below 68%. While such a reduction in SOC 391 may not have resulted in an SOC clamp control trigger, the amount of change in SOC may not be desirable. Once the load current stabilized, the battery may be charged and the SOC 391 revert back to the desired level of 70% SOC as permitted by the converter 202.

Figure 3A:
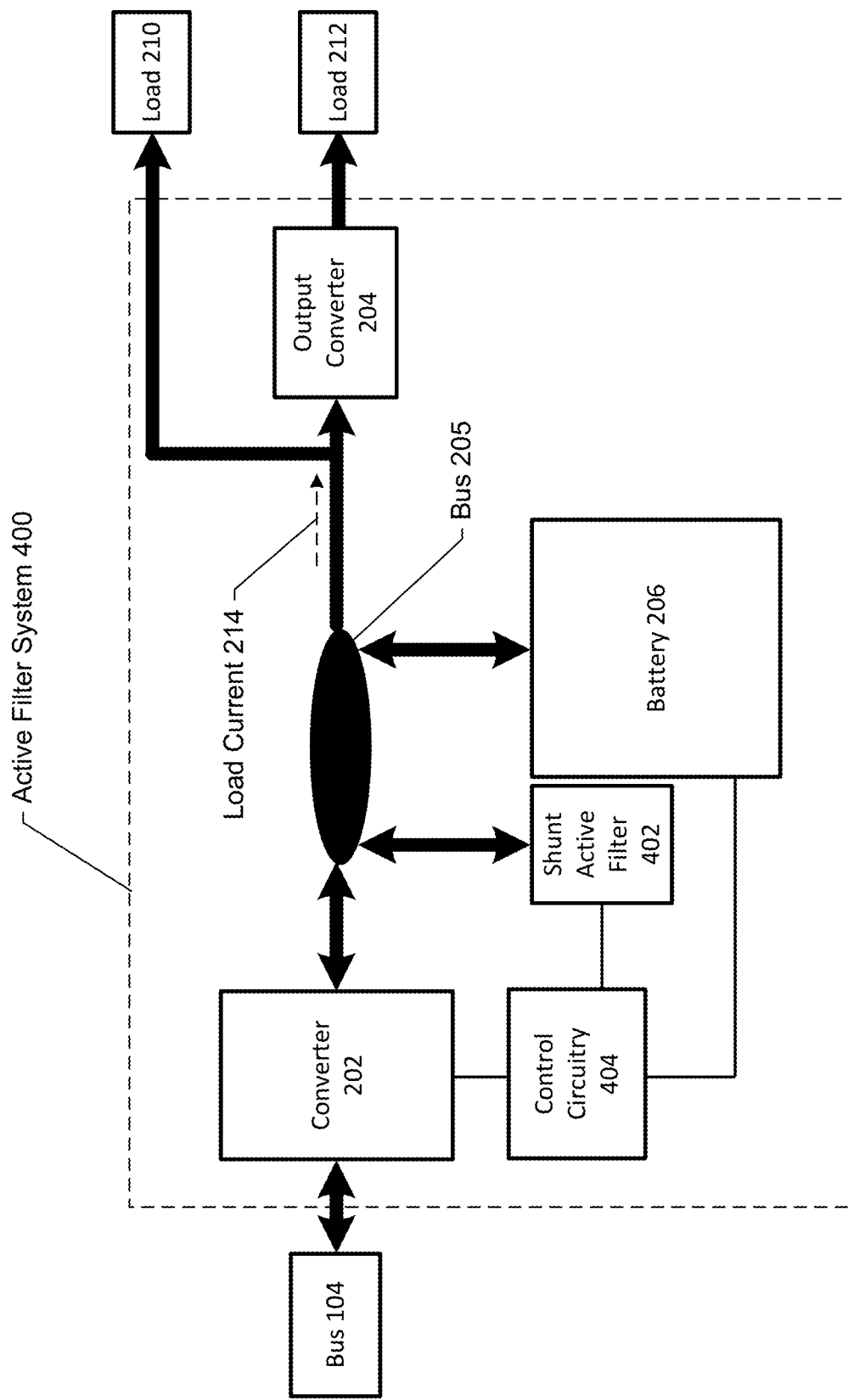
FIG. 3A illustrates an example active filter system according to some example embodiments.

Now referring to FIG. 3A, a detailed description of another example embodiment of an active filter system 400 is provided. The active filter system 400 may be connected to the bus 104 (or generator 102) at source-side or input of the active filter system 400 and to one or more loads 210 and 212 at a load-side or output of the active filter system 400. Additionally, the active filter system 400, similar to the active filter system 200, may comprise the converter 202, the output converter 204, the bus 205, and the battery 206. However, the active filter system 400 may also include a shunt active filter 402 connected to the bus 205, and control circuitry 404, which may be similar to the control circuitry 208 but may operate differently due to the inclusion of the shunt active filter 402. The control circuitry 404 may, according to some example embodiments, be a component of, and operate similar to, the filter system controller 108. As such, the converter 202 may operate differently in the active filter system 400 due to the control circuitry 404 controlling the converter 202 in a different manner due to a different active filter controls that consider the operation of the shunt active filter 402. Otherwise the components of the active filter system 400 operate the same as the active filter system 200 described above.

The shunt active filter 402 may be configured to provide further filtering of the output power to improve the power quality seen by the source, while still supporting the dynamic power needs of the load. According to some example embodiments, the shunt active filter 402 may be configured to filter the output power on the bus 205 in response to the energy storage device (e.g., battery 206) reaching an energy storage device charge or discharge rate or current limit. Additionally, according to some example embodiments, such charge or discharge rate or current limit may be indicated by a clamping control of the active filter system 400. Alternatively, the shunt active filter 402 may be configured to continuously filter the output power on the bus 205 simultaneously with the energy storage device (e.g., battery 206). Alternatively, the energy storage device (e.g., battery 206) may be configured to filter the output power on the bus 205 in response to the shunt active filter 402 reaching a shunt active filter charge or discharge rate or current limit.

In this regard, the shunt active filter 402 may operate as a controlled shunt, similar to the battery, and may sink or source current to the bus 205 to filter transients and other abrupt changes in load current. In this regard, the shunt active filter 402 may include a supplemental energy storage device (e.g., a capacitor, super capacitor, or the like) that can operate to remove high-frequency transients in the output power that, for example, the battery may be too slow to address. The shunt active filter 402 may filter small noisy and constant dynamics, and the battery 206 may filter larger dynamics.

Figure 3B:
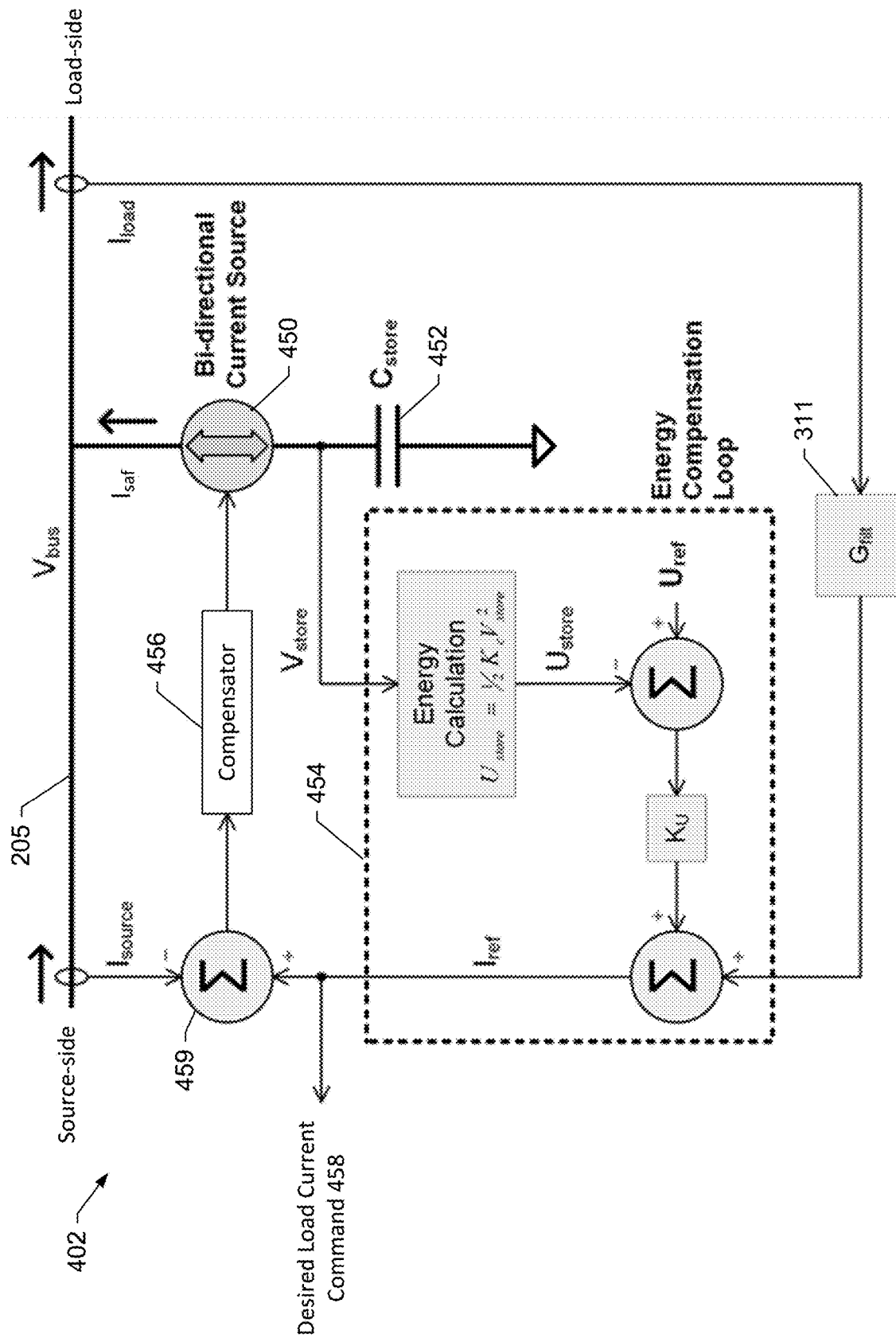
FIG. 3B illustrates an example shunt active filter according to some example embodiments.

FIG. 3B illustrates an example embodiment of a shunt active filter 402. According to some example embodiments, an example of a shunt active filter 402 may be embodied as an adaptive power system as described in U.S. Pat. No. 9,812,864 which is incorporated by reference herein in its entirety. In this regard, as similarly shown in FIG. 3A, the shunt active filter 402 may be connected in shunt with the bus 205. The example shunt active filter 402 may include a bi-directional current source 450 that operates together with a storage device 452 (also referred to herein as the supplemental energy storage device relative to the primary energy storage device, e.g., battery 206), which may be a storage capacitor, to perform filtering and support smooth power level transitions by delivering current to the bus 205 from the storage device 452 or absorbing current from the bus 205 for storage in the storage device 452, depending on the load. In this regard, according to some example embodiments, the shunt active filter 402 may comprise a feedback loop architecture (e.g., implemented in circuitry) that controls the sinking or sourcing of current by the store device 452 (i.e., $I_{saf}$) to or from the bus 205 based on a filter function (e.g., filter function $G_{filt}$ 311) and the load current, $I_{load}$, to create a filtered current to be drawn by the source, $I_{source}$. As such, the applied filter function may be the same filter function $G_{filt}$ 311 used in the active filter controls. The filter function $G_{filt}$ 311 can be the programmable controls to achieve the smoothing function on the up-stream current from the source.

The bi-directional current source 450 may be electrically coupled between the storage device 452 and the bus 205 and may be controlled to cause the storage device 452 to charge or discharge. The bi-directional current source 450 may be controlled by compensation circuitry 456 configured to provide the bi-directional current source 450 with a compensation value to control the operation of the bi-directional current source 450 thereby achieving the desired up-stream current from the source—a non-dynamic current profile. In this regard, the load current may be measured and filtered by a desired filter function 311. This filtered load current may provide the basis of this desired up-stream current from the source. A stored-energy estimate may be calculated or otherwise determined, for example, based on the load current, and used to maintain voltage regulation of the storage device 452. The energy compensation loop 454 may be used to maintain a voltage across the storage device 452 within an allowable rating. A value of the stored-energy estimate may be used by the energy compensation loop 454 to modify (in some cases slightly) a desired load current based on a voltage $V_{store}$ of the storage device 452. According to some example embodiments, the energy compensation loop 454 may also be used to maintain a state of charge of the storage device 452 within a minimum and maximum range of operation. However, the voltage across the storage device 452 may be controlled to vary significantly to facilitate operation of the shunt active filter 402 to sink and source current. Lastly, a measurement of the source current $I_{source}$ may be provided to a difference calculator 459 with the desired load current as provided by the desired load current command 458, to provide an error value to the compensator 456. The compensator 456, which may be implemented by circuitry, may be configured to control the bidirectional current source 450 to sink and source current such that the upstream source current on the bus 205 is equal to, or very close to, the desired load current command 458. The compensator 456 may also incorporate output limits that prevent the bidirectional current source 450 from exceeding specified current limits Accordingly, when the desired load current and the source current are equal, the difference calculator 459 provide a zero result to the compensator 456 causing no sinking or sourcing current to the bus 205 (i.e., $I_{saf}=0$).

Additionally, operation of the shunt active filter 402 may be limited by certain operational parameters. For example, such operational parameters may include the storage capacity of the capacitor 452, the rate of charge and discharge of the capacitor 452, voltage range of the capacitor, and the current capability of the bi-directional current source 450. In this regard, for example, based on a state of charge, the current of the shunt active filter 402 may be limited thereby defining a limiting relationship between the state of charge and the current. As such, for example, a charge and/or discharge current limit may be defined for the shunt active filter 402 to maintain operation of the shunt active filter 402 within a desired range for efficient operation.

Dynamic loads may not only produce noise at harmonic frequencies, but also noise at interharmonic (e.g., not multiples of 60 Hz on a 60 Hz system) and sub-harmonic (e.g., less than 60 Hz on a 60 Hz system) frequencies. The compensator 456, and more specifically, the energy compensation loop circuitry 454 and the filter function $G_{filt}$ 311 may enable the shunt active filter 402 to reduce the rate at which the power demand on the generator changes, thus limiting the dynamics and spectral content on the bus 205 and seen by the generator. According to some example embodiments, the shunt active filter 402 may operate to eliminate power dynamics on an upstream power system. Limiting the dynamics and spectral content on the bus 205 and seen by the source may allow a dynamic load to operate efficiently and within standard power quality parameters while providing a relatively smooth current to the source.

Figure 3C:
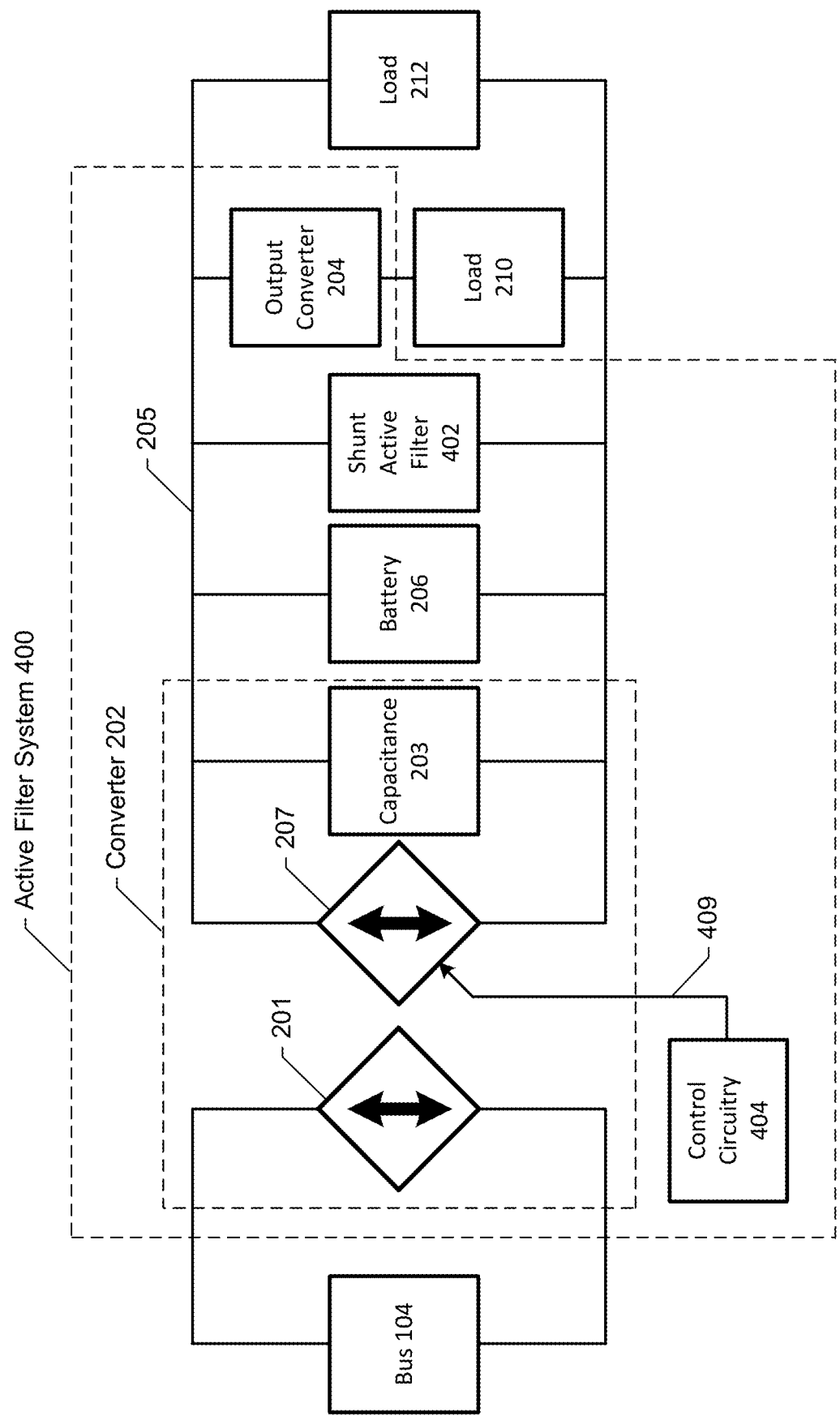
FIG. 3C illustrates an example model of an active filter system according to some example embodiments.

Having described the structure and function of an example shunt active filter 402, FIG. 3C will now be described, which illustrates an example circuit model or equivalent circuit model of the active filter system 400. In this regard, an equivalent circuit for the converter 202 is shown, similar to FIG. 2B, with an indication of the control input from the control circuitry 404 providing the control signal 409. The addition of the shunt active filter 402 is also shown in connection with the bus 205. As shown in FIG. 3C, the control circuitry 404 (which may be structured similar to the control circuitry 208 but configured to operate differently) may create a filtered load by providing the control signal 409 to the dependent current source 207 to control the output power of the converter 202 on the bus 205. The components shown in FIG. 3C are shown in a connection configuration based on the configuration in FIG. 3A, albeit in slightly more detail.

Figure 3D:
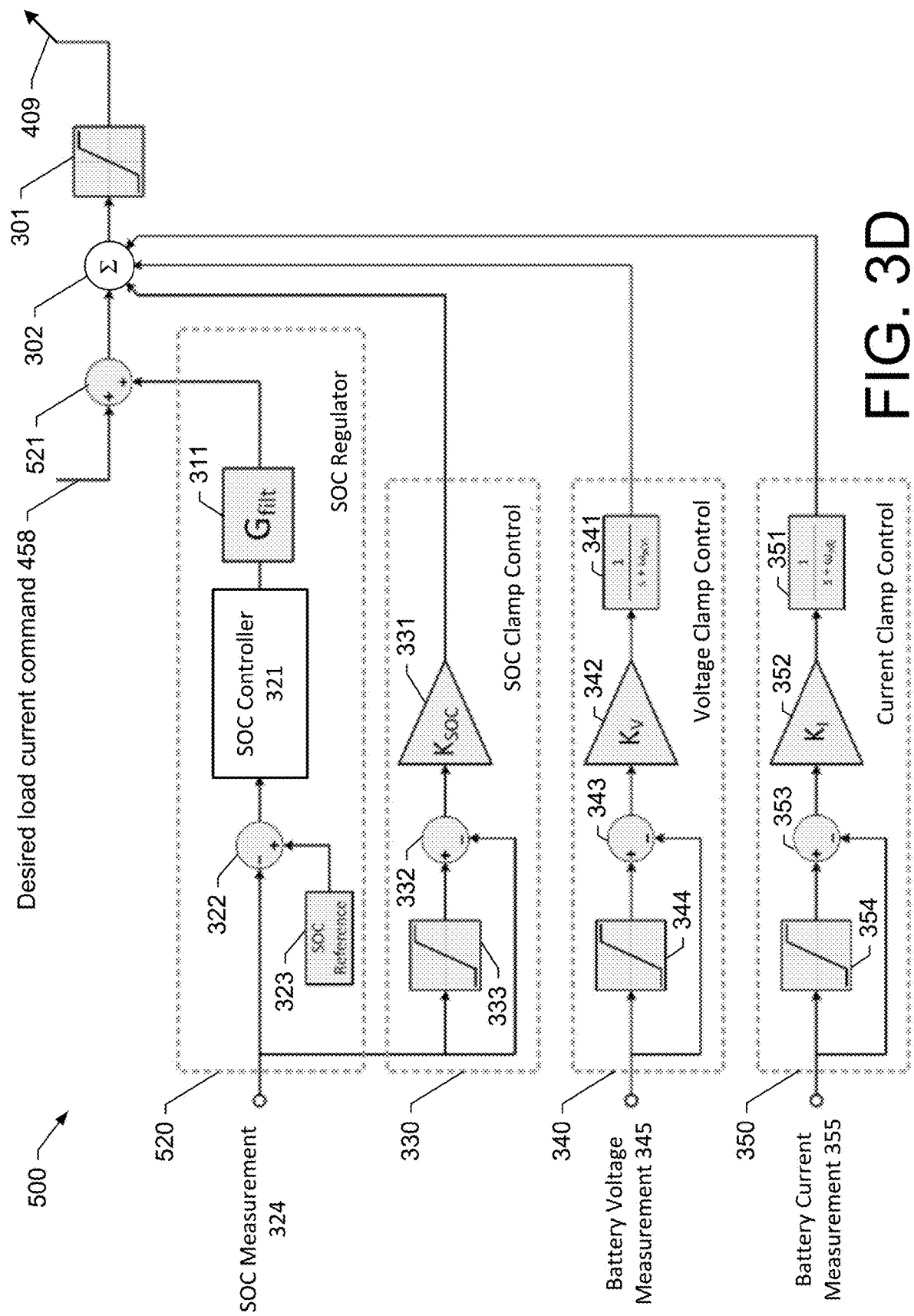
FIG. 3D illustrates an example active filter controls according to some example embodiments.

FIG. 3D illustrates the functional configuration 500 of a portion of the control circuitry 404 that illustrates the active filter controls. The active filter controls may be used to control the operation of the converter 202 to create a filtered load by the active filter system 400. The functional configuration 500 illustrated and described with respect to FIG. 3D may be embodied in hardware components, such as an FPGA, ASIC, passive components, and the like, or in software code executed by a processor. As such, to generate the control signal 409 (which may also be referred to as an output-current command), the functional configuration 500 may include a number of active filter controls that are combined at a summation component 302 and passed through an output limiter 301. The output limiter 301 may be configured to control a maximum or minimum level for the control signal 409 such that the signal may be clipped at a maximum or minimum level. The output limiter 301 may be useful, in particular, when more than one active filter control has been triggered and the magnitude of the output of the summation component 302 is therefore higher than necessary to control the current by the converter 202.

The active filter controls for the functional configuration 500 may include an SOC regulator 520. The SOC regulator 520 may be determined based on an SOC measurement from the energy storage device that functions similarly to the SOC Regulator 320. The SOC Regulator 520 may include the programmable filter function 311 ($G_{filt}$), the output of which is combined with the desired load current command 458 from the shunt active filter 402 to be an input of control of the converter 202 via the control signal 409.

In this regard, the SOC measurement 324 may be an input to an SOC regulator 520 that generates an SOC output for combination, at summer component 521, with the desired load current command 458 of the shunt active filter 402. The SOC measurement is used, along with the desired load current command 458, to create a filtered load while maintaining the SOC of the battery at, or close to, a desired SOC value when input power is available for charging, allowing for effective filtering operation. The SOC regulator 520 may be configured to generate a usable output that may be combined with the desired load current command 458 for use in creating the filtered load.

The desired load current command 458 may be used, instead of a separate load measurement with a filter command, to cause the commanded current out of the converter 202 to match (or exactly match) the remaining current after the shunt active filter 402 has performed filtering. In this way, the battery 206 may see no dynamics and remain idle. The desired load current command 458 includes the energy-compensation loop 454 adjustments to the filtered load current and therefore effectively operates as an SOC regulator for the capacitor 452 of the shunt active filter 202. Accordingly, the desired load current command 458 may, according to some example embodiments, primarily account for losses in the shunt active filter 402 and any sensor reading errors. If the desired load current command 458 were not leveraged in this way, the battery 206 would have small dynamics that are a mismatched between the desired filtered load current and the remaining load after the shunt active filter 402 filters the load, and the battery 206 would not be idle. However, the system may still operate as a useful active filter that utilizes the battery more frequently.

In this regard, the SOC regulator 520 may comprise a summation component 322 and an SOC controller 321. The summation component 322 may be configured to receive the SOC measurement 324 and compare the SOC measurement 324 to an SOC reference 323 to determine a difference value between the SOC measurement 324 and the SOC reference 323. This difference value may be provided to the SOC controller 321. The SOC controller 321 may act upon the difference value to convert the difference value into a representative value that may be provided to the filter function 311, which may be a transfer function as described above. The output of the filter function ($G_{filt}$) 311 and the SOC regulator 520 may be summed with the desired load current command 458 to control the current output of the converter 202 via the control signal 409 based on the SOC and the desired load current command 458, in a non-clamping mode. The filter function 311 may be defined based on the capabilities of the source bus 104 or generator 102. In this regard, the filter function 311 and the SOC controller 321 may be defined to control the current output to the bus 205 to maintain operation of the battery 206 and the shunt active filter 402 within a desired range for SOC. Accordingly, the output of the filter function 311, and thus the SOC measurement 324, may be provided to the summation component 521 to consider the operation of the shunt active filter 402. The output of the summer component 521 may be provided to the summer component 302, and if no clamping event has occurred, the output of the summer component 521 may be unaffected by the summation component 302, and if not clipped by the output limiter 301, the output of the summer component 521 may be the control signal 409 for provision to the converter 202.

However, as described above, in some instances the SOC, the battery voltage, and/or the battery current may exceed respective limits that would lead to the implementation of a clamping event. In this regard, if a clamping event occurs, an output of a respective clamping control provided to the summation component 302 may dominate the summing operation. As such, the clamping output may dominate the output of the summation component 302, and if the output passes through (or is capped) by output limiter 301, a response to the clamping event may be implemented by the converter 202 due to the nature of the control signal 209 in a context of a clamping event.

As such, the same three different active filter controls used as clamping controls described with respect to the functional configuration 300 may also be implemented in the context of the functional configuration 500 for generating the control signal 409. However, according to some example embodiments, the limits at the respective output limiters 333, 344, and 354 may be different. The SOC clamp control 330, the voltage clamp control 340, and the current clamp control 350 may be included and implemented in the same manner as described above.

As such, the summer component 302 operates to combine the output of the SOC regulator 520 with the desired load current command 458, the SOC clamp control 330, the voltage clamp control 340, and the current clamp control 350. In an instance where more than one of the clamping controls are triggered (i.e., the input exceeds the limit of the respective output limiter), the controls may add together to, for example, have an excessively high magnitude. As such, the output limiter 301 addresses this situation and limits the control signal 409 to a maximum value, regardless of the number of clamping controls that are triggered. Accordingly, whether the limit of the output limiter 301 is trigger or not, the output of the output limiter 301 is provided as the control signal 409 to the converter 202.

Figure 3E:
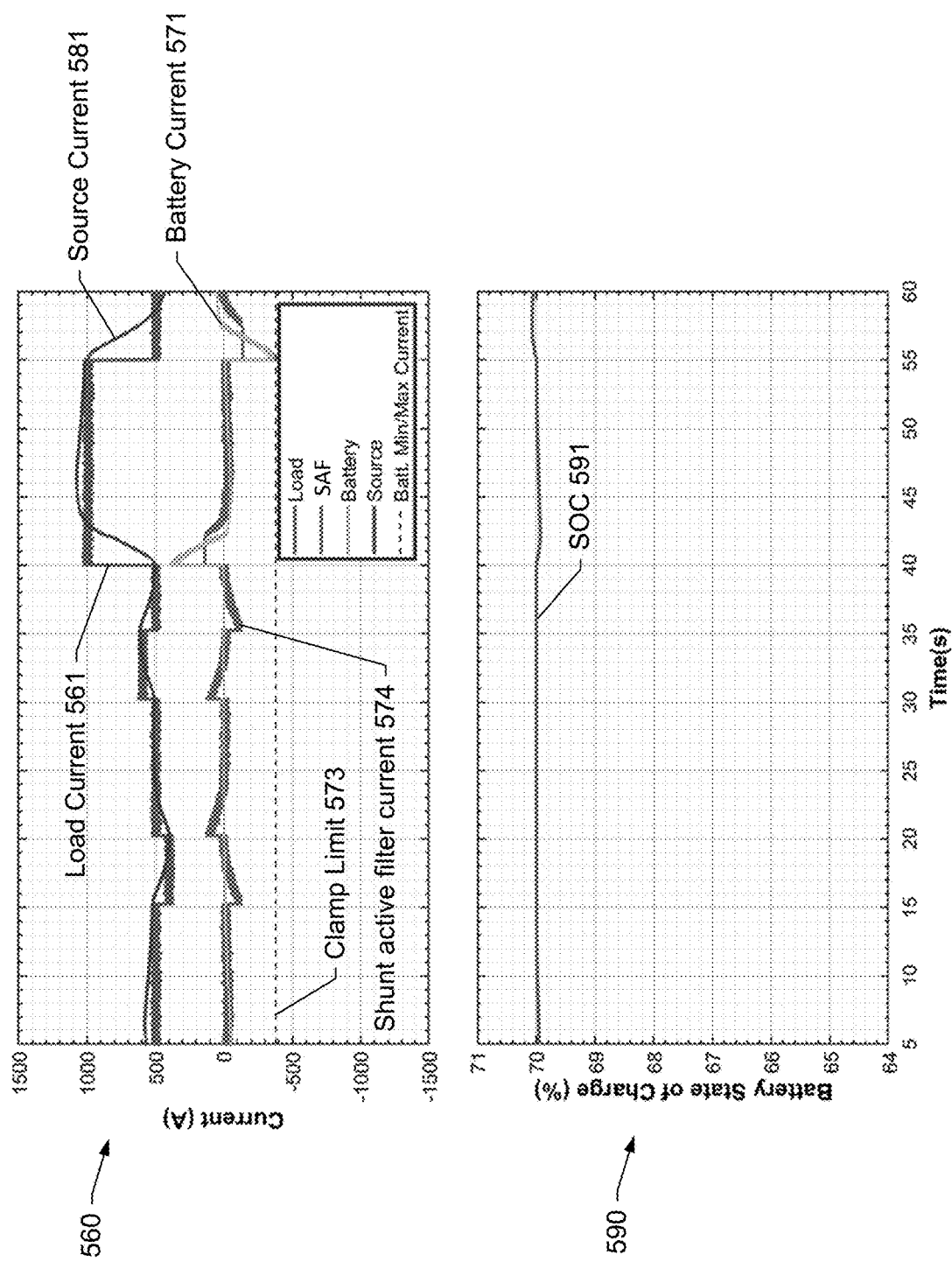
FIG. 3E illustrates graphs of currents for a power system operating and a graph of a state-of-charge of a battery using an example active filter system according to some example embodiments.

FIG. 3E graphically illustrates the operation of the active filter system 400. As such, graph 560 illustrates the load current 561 demanded by a dynamic load that has step-function load current changes with a fairly regular noise dynamic. The battery current 571 is effectively idle until the load current 561 increases suddenly by approximately 500 amps at time 40 s, with only slight variations in current due to the starting conditions of the example simulation. Accordingly, the shunt active filter current 574 reaches its maximum output of 137.5 A, with the battery current 571 increasing from near zero to approximately 390 amps at time 40 s, delivering the additional dynamic current that the shunt active filter 402 cannot. Both the shunt active filter current 574 and battery current 571 decline to near zero as a function of the active filter with a relatively stable load current 561 thereafter. At 55 seconds, when the load current 561 drops back to approximately 500 amps, the shunt active filter 402 once again reaches its active filter limit, this time sinking current of 137.5 A, with the battery current 571 absorbing the rest of the dynamic load current just at the battery's clamp limit 573. The combination of the battery's clamp limit 573 and the maximum sink and source current of the shunt active filter 402 is designed for this particular load step size, such that the clamp limit 573 is just barely reached, allowing for minimization of the shunt active filter 402 hardware. The shunt active filter current 574 responds to the regular noise dynamic of the load current 561 and also operates to source or sink current to compensate for the smaller step changes in the load current 561. As can be seen, due to the filtering performed, the source current 581 changes in a relatively smooth manner, despite the abrupt and extreme changes in the load current 561.

Graph 590 shows the SOC 591 of the battery in the scenario shown in the graph 560. As can be seen, the SOC 591 remains relatively constant at the desired SOC reference 323 of 70%. Only minor deviations of less than ¼ of a percent occur as a result of the abrupt and extreme changes in the load current at 40 s and 55 s, requiring the short-time use of the battery to manage smooth power transitions as seen from the source bus 104. As can be seen, the operation of the shunt active filter 402 in combination with the battery 206 operates to maintain the battery 206 at the desired SOC for effective filtering operation (e.g., 70% SOC).

Figure 4:
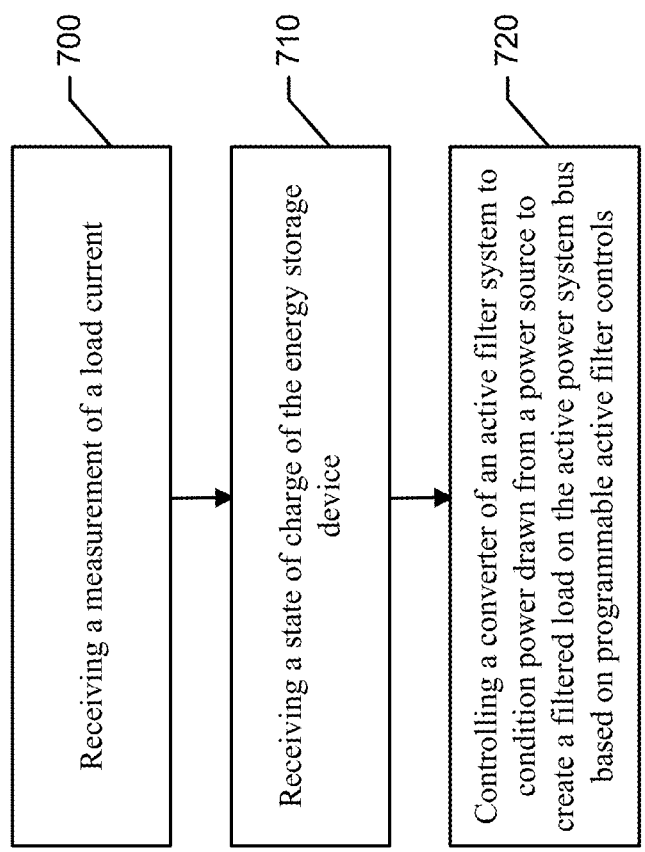
FIG. 4 illustrates a flowchart of an example method for supporting load filtering to a power system powering dynamic loads according to an example embodiment.

Now with reference to FIG. 4, a flowchart of an example method for filtering power on a power system is provided. The method of FIG. 4 may be performed by, for example, the control circuitry 208 or 404, which, based on the description above, may be components of, for example, the filter system controller 108. According to some example embodiments, the example method may comprise, at 700, receiving a measurement of a load current, and at 710, receiving a state of charge of the energy storage device. In this regard, the energy storage device may be electrically coupled to an active filter system to filter power delivered to the active filter system bus via charge and discharge of the energy storage device. The example method may further comprise controlling a converter of an active filter system to condition power drawn from a power source to create a filtered load on the active power system bus and/or the power source based on programmable active filter controls, the programmable active filter controls being based on the measurement of a load current, the state of charge of the energy storage device, operational safety limits of the energy storage, and a desired filter function.

Additionally, according to some example embodiments, the example method may further comprise performing an active shunt operation to filter the power delivered to the active filter system bus, where the active shunt operation may be performed by a shunt active filter electrically coupled to the active filter system bus. The shunt active filter may comprise a supplemental energy storage device that is controlled to perform the active shunt operation. According to some example embodiments, the shunt active filter may be configured to perform the active shunt operation in response to the energy storage device reaching an energy storage device charge or discharge current limit. According to some example embodiments, the shunt active filter may be configured to continuously filter the power simultaneously with the energy storage device via controlled active shunt operations. According to some example embodiments, the energy storage device may be configured to filter the power in response to the shunt active filter reaching a shunt active filter charge or discharge current limit.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An active filter system for filtering power on a power system comprising:
a converter configured to be electrically coupled to a generator at a converter input and an active filter system bus at a converter output such that source current from the generator passes through the converter, the converter being configured to deliver power to the active filter system bus that serves a dynamic load;
a primary energy storage device electrically coupled to the active filter system bus and configured to filter the power via charge and discharge of the primary energy storage device;
a shunt active filter electrically coupled to the active filter system bus, the shunt active filter comprising a supplemental energy storage device that is controlled to perform an active shunt operation to filter the power on the active filter system bus, wherein shunt active filter and the primary energy storage device are controlled to operate collaboratively to perform filtering on the active filter system bus; and
control circuitry configured to control the converter to condition power drawn from the generator to create a filtered load based on programmable active filter controls, the programmable active filter controls being based on a measurement of a load current being supplied to the dynamic load and a state of charge of the primary energy storage device.

2. The active filter system of claim 1 wherein the shunt active filter is configured to filter the power in response to the primary energy storage device reaching a primary energy storage device charge current limit or a primary energy storage device discharge current limit.

3. The active filter system of claim 1 wherein the shunt active filter is configured to continuously filter the power simultaneously with the primary energy storage device.

4. The active filter system of claim 1 wherein the primary energy storage device is configured to filter the power in response to the shunt active filter reaching a shunt active filter charge current limit or a shunt active filter discharge current limit.

5. The active filter system of claim 1, wherein the converter comprises the control circuitry;
wherein the control circuitry is configured to control the converter via a control signal provided to the converter;
wherein the control circuitry comprises output limiter configured to limit an output level of the control signal provided to the converter when more than one of the programmable active filter controls are triggered and contribute to the output level.

6. The active filter system of claim 1 wherein the control circuitry is configured to control the converter via a control signal provided to the converter;
wherein the active filter controls further comprise a state of charge clamp control that is based on a comparison of the state of charge of the primary energy storage device to a state of charge limit;
wherein the state of charge clamp control is included in the control signal provided to the converter.

7. The active filter system of claim 1 wherein the control circuitry is configured to control the converter via a control signal provided to the converter;
wherein the active filter controls further comprise a voltage clamp control that is based on a comparison of a voltage of the primary energy storage device to a voltage limit;
wherein the voltage clamp control is included in the control signal provided to the converter.

8. The active filter system of claim 1 wherein the control circuitry is configured to control the converter via a control signal provided to the converter;
wherein the active filter controls further comprise a current clamp control that is based on a comparison of a current of the primary energy storage device to a current limit;
wherein the current clamp control is included in the control signal provided to the converter.

9. A filter system controller for filtering power on a power system, in cooperation with a primary energy storage device, the filter system controller comprising control circuitry configured to:
receive a measurement of a load current;
receive a state of charge of the primary energy storage device, the primary energy storage device being electrically coupled to an active filter system bus to filter power delivered to the active filter system bus via charge and discharge of the primary energy storage device;
control a supplemental energy storage device of a shunt active filter electrically coupled to the active filter system bus to perform an active shunt operation to filter power on the active filter system bus, wherein shunt active filter and the primary energy storage device are controlled to operate collaboratively to perform filtering on the active filter system bus; and
control a converter of an active filter system to condition power drawn from a generator to create a filtered load on the active filter system bus based on programmable active filter controls, the programmable active filter controls being based on the measurement of a load current and the state of charge of the primary energy storage device, the converter being configured to be electrically coupled between the generator and the active filter system bus such that source current from the generator passes through the converter.

10. The filter system controller of claim 9 wherein the shunt active filter is configured to filter the power in response to the primary energy storage device reaching a primary energy storage device charge current limit or a primary energy storage device discharge current limit.

11. The filter system controller of claim 9 wherein the shunt active filter is configured to continuously filter the power simultaneously with the primary energy storage device.

12. The filter system controller of claim 9 wherein the primary energy storage device is configured to filter the power in response to determining that the shunt active filter has reached a shunt active filter charge current limit or a shunt active filter discharge current limit.

13. The filter system controller of claim 9 wherein the control circuitry is a component of the converter.

14. The filter system controller of claim 9 wherein the control circuitry is configured to control the converter via a control signal;
wherein the active filter controls further comprise a state of charge clamp control that is based on a comparison of the state of charge of the primary energy storage device to a state of charge limit;
wherein the state of charge clamp control is included in the control signal.

15. The filter system controller of claim 9 wherein the control circuitry is configured to control the converter via a control signal;
wherein the active filter controls further comprise a voltage clamp control that is based on a comparison of a voltage of the primary energy storage device to a voltage limit;
wherein the voltage clamp control is included in the control signal.

16. The filter system controller of claim 9 wherein the control circuitry is configured to control the converter via a control signal;
wherein the active filter controls further comprise a current clamp control that is based on a comparison of a current of the primary energy storage device to a current limit;
wherein the current clamp control is included in the control signal.

17. A method for filtering power on a power system, the method comprising:
receiving a measurement of a load current;
receiving a state of charge of a primary energy storage device, the primary energy storage device being electrically coupled to an active filter system bus to filter power delivered to the active filter system bus via charge and discharge of the primary energy storage device;
controlling a supplemental energy storage device of a shunt active filter electrically coupled to the active filter system bus to perform an active shunt operation to filter the power on the active filter system bus, wherein shunt active filter and the primary energy storage device are controlled to operate collaboratively to perform filtering on the active filter system bus; and
controlling, by control circuitry, a converter of an active filter system to condition power drawn from a generator to create a filtered load on the active filter system bus based on programmable active filter controls, the programmable active filter controls being based on the measurement of a load current and the state of charge of the primary energy storage device, the converter being electrically coupled between the generator and the active filter system bus such that source current from the generator passes through the converter.

18. The method of claim 17 wherein the shunt active filter is configured to perform the active shunt operation in response to the energy storage device reaching a primary energy storage device charge current limit or a primary energy storage device discharge current limit.

19. The method of claim 17 wherein the shunt active filter is configured to continuously filter the power simultaneously with the primary energy storage device via controlled active shunt operations.

20. The method of claim 17 wherein the primary energy storage device is configured to filter the power in response to the shunt active filter reaching a shunt active filter charge current limit or a shunt active filter discharge current limit.

* * * * *